(12) United States Patent
Murschall et al.

(10) Patent No.: US 6,187,422 B1
(45) Date of Patent: Feb. 13, 2001

(54) AMORPHOUS TRANSPARENT PLATE MADE OF CRYSTALLIZABLE THERMOPLASTIC MATERIALS

(75) Inventors: Ursula Murschall, Nierstein; Wolfgang Gawrisch, Gau-Bischofsheim; Rainer Brunow, Eppstein, all of (DE)

(73) Assignee: Hostaglas LTD, Dublin (IE)

( * ) Notice: Under 35 U.S.C. 154(b), the term of this patent shall be extended for 0 days.

(21) Appl. No.: 08/973,046

(22) PCT Filed: May 21, 1996

(86) PCT No.: PCT/EP96/02174

§ 371 Date: Jan. 26, 1998

§ 102(e) Date: Jan. 26, 1998

(87) PCT Pub. No.: WO96/38282

PCT Pub. Date: Dec. 5, 1996

(30) Foreign Application Priority Data

May 29, 1995 (DE) .............................. 195 19 579

(51) Int. Cl.[7] ..................................................... B32B 7/02
(52) U.S. Cl. .............................. 428/220; 428/38; 428/96; 428/213; 428/42.1
(58) Field of Search .............................. 264/171, 92, 216, 264/176; 428/38, 40.4, 42.1, 76, 96, 101, 156, 213, 220

(56) References Cited

U.S. PATENT DOCUMENTS

| 3,956,229 | * | 5/1976 | Bollen et al. ................. 260/40 R |
|---|---|---|---|
| 3,975,355 | * | 8/1976 | Bollen et al. ................. 260/40 R |
| 3,975,485 | * | 8/1976 | Bollen et al. ................. 264/171 |
| 4,020,126 | * | 4/1977 | Gander et al. ................. 260/873 |
| 4,029,631 | * | 6/1977 | Bollen et al. ................. 260/40 R |
| 4,230,656 | | 10/1980 | Amin et al. . |
| 4,333,907 | | 6/1982 | Urasaki et al. . |

FOREIGN PATENT DOCUMENTS 30 28 993   2/1981  (DE) .
21 77 045   1/1987  (GB) .

OTHER PUBLICATIONS

Patent Abstracts of Japan, vol. 17, No. 74, by Tsunoda Hirotaka, entitled Amorphous Pet Sheet and Preparation Thereof.

2376 Kunstoffe, 80 (1990), Jan., No. 1, Munchel, DE, pp. 21–25.

\* cited by examiner

*Primary Examiner*—Merrick Dixon
(74) *Attorney, Agent, or Firm*—Frommer Lawrence & Haug

(57) ABSTRACT

The invention relates to a transparent, amorphous sheet having a thickness in the range from 1 to 20 mm which contains, as principal constituent, a crystallizable thermoplastic, where the surface gloss, measured in accordance with DIN 67530 (measurement angle 20°), is greater than 130, the light transmission, measured in accordance with ASTM D 1003, is greater than 84%, and the haze of the sheet, measured in accordance with ASTM D 1003, is less than 15%, to a process for the production of the sheet, and to the use of the sheet.

16 Claims, 2 Drawing Sheets

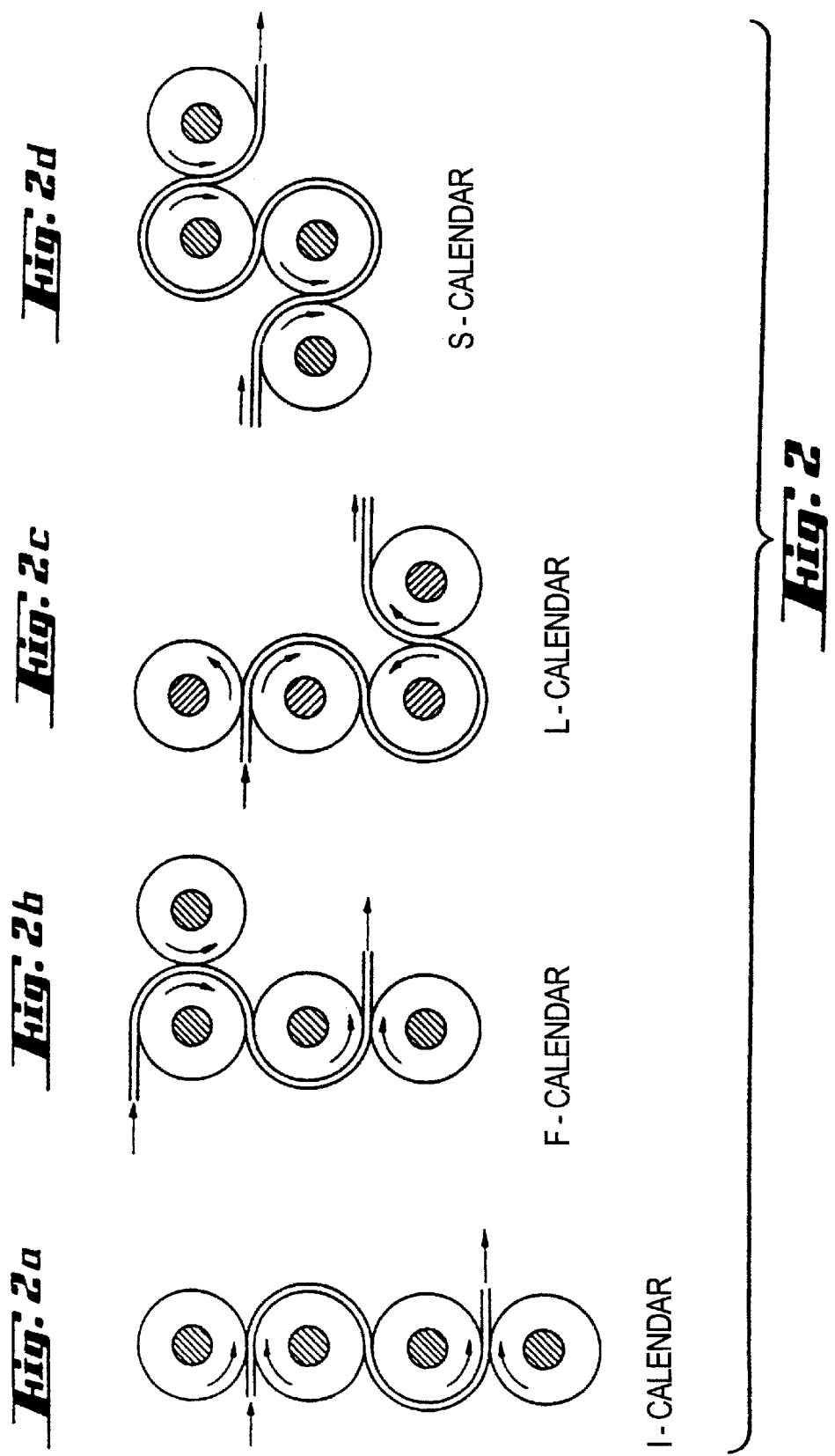

AMORPHOUS TRANSPARENT PLATE MADE OF CRYSTALLIZABLE THERMOPLASTIC MATERIALS

Figure 1:
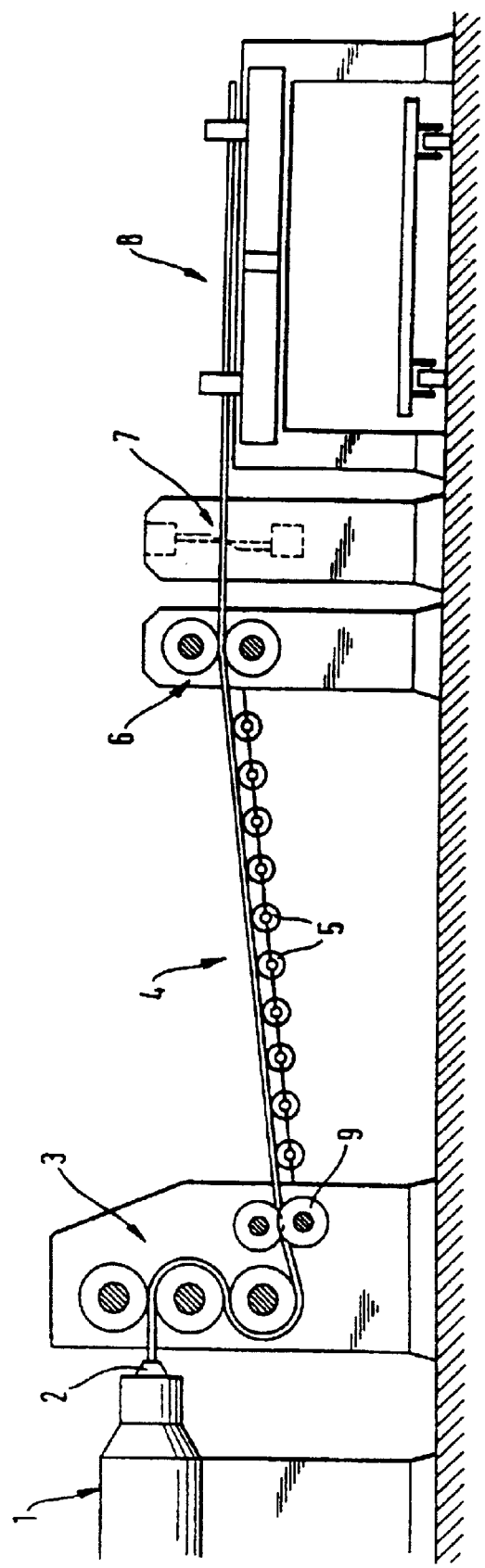

The invention relates to an amorphous, transparent sheet of a crystallizable thermoplastic whose thickness is in the range from 1 to 20 mm. The sheet is distinguished by very good optical and mechanical properties. The invention furthermore relates to a process for the production of this sheet, and to the use of the sheet.

Amorphous, transparent sheets having a thickness of from 1 to 20 mm are well known. These two-dimensional structures comprise amorphous, non-crystallizable thermoplastics. Typical examples of such thermoplastics which can be converted into sheets are, for example, polyvinyl chloride (PVC), polycarbonate (PC) and polymethyl methacrylate (PMMA). These semifinished products are produced on so-called extrusion lines (cf. Polymer Werkstoffe, Volume Is, Technologie 1, p. 136, Georg Thieme Verlag, Stuttgart, 1984). The pulverulent or granular raw material is melted in an extruder. After extrusion, the amorphous thermoplastics can easily be shaped via polishing stacks or other shaping tools as a consequence of their viscosity, which continuously increases with decreasing temperature. After shaping, amorphous thermoplastics then have adequate stability, i.e. a high viscosity, in order to be self-supporting in the calibration die. However, they are still sufficiently soft to be shaped by the die. The melt viscosity and inherent rigidity of amorphous thermoplastics is so high in the calibration die that the semifinished product does not collapse in the calibration die before cooling. In the case of easily decomposed materials, for example PVC, special processing aids, for example processing stabilizers against decomposition and lubricants against excessive internal friction and thus uncontrollable warming, are necessary during extrusion. External lubricants are necessary to prevent sticking to walls and rolls.

The processing of PMMA is carried out using, for example, a vented extruder to enable removal of moisture.

The production of transparent sheets from amorphous thermoplastics sometimes requires expensive additives, which in some cases migrate and can cause production problems owing to evaporations and surface coatings on the semifinished product. PVC sheets can be recycled only with difficulty or using special neutralization or electrolysis processes. PC and PMMA sheets can likewise only be recycled with difficulty and only with loss or extreme impairment of the mechanical properties.

In addition to these disadvantages, PMMA sheets also have extremely poor impact strengths and splinter on fracture or mechanical loading. Furthermore, PMMA sheets are readily combustible, which means that they cannot be employed, for example, for internal applications and in exhibitions.

PMMA and PC sheets furthermore cannot be shaped when cold; PMMA sheets disintegrate to form dangerous splinters, while PVC sheets undergo hairline cracking and stress whitening.

EP-A-0 471 528 describes a process for shaping an article from a polyethylene terephthalate (PET) sheet. The PET sheet is heat-treated on both sides in the thermofilming mold in a temperature range between the glass transition temperature and the melting point. The shaped PET sheet is removed from the mold when the degree of crystallization of the shaped PET sheet is in the region of 25 to 50%. The PET sheets disclosed in EP-A-0 471 528 have a thickness of from 1 to 10 mm. Since the thermoformed molding produced from the PET sheet is partially crystalline and thus no longer transparent and the surface properties of the molding are determined by the thermoforming process and by the thermoforming temperature and mold, it is unimportant what optical properties (for example gloss, haze and light transmission) the PET sheets employed have. In general, the optical properties of these sheets are poor and in need of optimization.

U.S. Pat. No. 3,496,143 describes the vacuum thermoforming of a 3 mm thick PET sheet whose degree of crystallization is said to be in the range from 5 to 25%. However, the crystallinity of the thermoformed molding is greater than 25%. Again, no requirements regarding optical properties are made of these PET sheets. Since the crystallinity of the sheets employed is already between 5 and 25%, these sheets are hazy and non-transparent.

The object of the present invention is to provide an amorphous, transparent sheet having a thickness of from 1 to 20 mm which has both good mechanical properties and good optical properties.

The good optical properties include, for example, high light transmission, high surface gloss, extremely low haze and high clarity.

The good mechanical properties include, inter alia, high impact strength and high breaking strength.

In addition, the novel sheet should be recyclable, in particular without loss of the mechanical properties, and have low combustibility so that it can also be employed, for example, for internal applications and in exhibitions.

This object is achieved by a transparent, amorphous sheet having a thickness in the range from 1 to 20 mm which contains, as principal constituent, a crystallizable thermoplastic, where the surface gloss, measured in accordance with DIN 67530 (measurement angle 20°), is greater than 130, preferably greater than 140, the light transmission, measured in accordance with ASTM D 1003, is greater than 84%, preferably greater than 86%, and the haze of the sheet, measured in accordance with ASTM D 1003, is less than 15%, preferably less than 11%.

The transparent, amorphous sheet contains, as principal constituent, a crystallizable thermoplastic. Suitable crystallizable or partially crystalline thermoplastics are, for example, polyethylene terephthalate, polybutylene terephthalate, cycloolefin polymers and cycloolefin copolymers, particular preference being given to polyethylene terephthalate.

For the purposes of the invention, the term crystallizable thermoplastic is taken to mean crystallizable homopolymers, crystallizable copolymers, crystallizable compounds, crystallizable recyclate and other variations of crystallizable thermoplastic.

For the purposes of the present invention, the term amorphous sheet is taken to mean a sheet which is noncrystalline, although the crystallizable thermoplastic employed preferably has a crystallinity of from 25 to 65%. Non-crystalline, i.e. essentially amorphous, means that the degree of crystallinity is generally less than 5%, preferably less than 2%, particularly preferably 0%.

In the case of polyethylene terephthalate, measurement of the Charpy impact strength $a_n$ (measured in accordance with ISO 179/1D) of the sheet is preferably not accompanied by a fracture. In addition, the Izod notched impact strength $a_k$ (measured in accordance with ISO 180/1A) is preferably in the range from 2.0 to 8.0 kJ/m², particularly preferably in the range from 4.0 to 6.0 kJ/m².

The clarity of the sheet measured at an angle of less than 2.5° (ASTM D 1003) is preferably greater than 96%, particularly preferably greater than 97%.

Polyethylene terephthalate polymers having a crystalline melting point $T_m$, as measured by DSC (differential scanning calorimetry) at a heating rate of 10° C./min, of from 220° to 280° C., preferably from 250° C. to 270° C., a crystallization temperature range $T_c$ from 75° C. to 280° C., a glass transition temperature $T_g$ of from 65° C. to 90° C. and a density, measured in accordance with DIN 53479, of from 1.30 to 1.45 and a crystallinity of from 5% to 65%, preferably from 25% to 65%, are preferred polymers as starting materials for production of the sheet.

The standard viscosity SV (DCA) of the polyethylene terephthalate, measured in dichloroacetic acid in accordance with DIN 53728, is from 800 to less than 1800, in particular from 800 to 1400, preferably from 950 to 1250, particularly preferably from 1000 to 1200.

The intrinsic viscosity IV (DCA) is calculated from the standard viscosity SV (DCA) as follows:

$$IV (DCA) = 6.67 \cdot 10^{-4} \; SV (DCA) + 0.118$$

The bulk density, measured in accordance with DIN 53466, is preferably from 0.75 to 1.0 kg/dm$^3$, particularly preferably from 0.80 to 0.90 kg/dm$^3$.

The polydispersity of the polyethylene terephthalate $M_w/M_n$, measured by GPC, is preferably from 1.5 to 6.0, particularly preferably from 2.0 to 3.5.

In addition, entirely unexpectedly, good cold formability without fracture, microcracking and/or stress whitening was observed, meaning that the novel sheet can be shaped and bent without the action of heat.

In addition, measurements showed that the novel sheet has low combustibility and low flammability, so that it is suitable, for example, for internal applications and in exhibitions.

Furthermore, the novel sheet can easily be recycled without environmental pollution and without loss of the mechanical properties, meaning that it is suitable, for example, for use as short-term advertizing hoardings or other advertizing articles.

The novel transparent, amorphous sheet can be produced, for example, by extrusion in an extrusion line.

An extrusion line of this type is shown diagrammatically in FIG. 1. It essentially comprises an extruder as plastication unit, a sheet die as shaping tool, a polishing stack/calendar as calibration die, a cooling bed and/or a roller conveyor for aftercooling, a take-off roll, a separating saw, an edge trimming device, and, if desired, a stacking unit.

The process for the production of the novel sheet is described in detail below using the example of polyethylene terephthalate.

The process comprises drying the polyethylene terephthalate if necessary, then melting the dry polymer in the extruder, extruding the melt through a die, calibrating, smoothing and cooling the sheet in the polishing stack and then cutting the sheet to size.

The polyethylene terephthalate is preferably dried at from 160 to 180° C. for from 4 to 6 hours before extrusion.

The polyethylene terephthalate is then melted in the extruder. The temperature of the PET melt is preferably in the range from 250 to 320° C., it being possible for the temperature of the melt to be adjusted essentially both through the temperature of the extruder and through the residence time of the melt in the extruder.

The melt then leaves the extruder through a die. This die is preferably a sheet die.

The PET melted by the extruder and shaped by a sheet die is calibrated, i.e. intensively cooled and smoothed, by smoothing calendar rolls. The calendar rolls can be arranged, for example, in an I-, F-, L- or S-shape (see FIG. 2).

The PET material can then be cooled on a roller conveyor, cut to size in width, cut into appropriate lengths and finally stacked.

The thickness of the PET sheet is determined essentially by the take-off unit, which is arranged at the end of the cooling zone, the cooling (smoothing) rolls, which are coupled to the take-off unit with respect to speed, and the conveying rate of the extruder on the one hand and the separation between the rolls on the other hand.

The extruders employed can be either single-screw or twin-screw extruders.

The sheet die preferably comprises a collapsible die body, the lips and the restrictor bar for flow regulation over the width. To this end, the restrictor bar can be bent by means of tension and pressure screws. The thickness is set by adjusting the lips. It is important to ensure a uniform temperature of the PET and of the lip, since otherwise the PET melt flows out through the various flow channels in different thicknesses.

The calibration tool, ie. the smoothing calendar, gives the PET melt shape and dimensions. This is achieved by freezing at below the glass transition temperature by cooling and smoothing. Shaping should not be carried out in this state, since otherwise surface defects would form in this cooled state. For this reason, the calendar rolls are preferably driven jointly. The temperature of the calendar rolls must be lower than the crystalline melting point in order to avoid sticking of the PET melt. The PET melt leaves the sheet die at a temperature of from 240 to 300° C. The first smoothing/chill roll is at a temperature of from 50° C. to 80° C., depending on the output rate and sheet thickness. The second, somewhat colder roll cools the second or other surface.

To obtain an amorphous sheet having a thickness of from 1 mm to 20 mm, it is essential for the temperature of the first smoothing/chill roll to be from 50° C. to 80° C.

While the calibration unit freezes the PET surfaces as smoothly as possible and cools the profile until it is rigid in shape, the aftercooling device lowers the temperature of the PET sheet virtually to room temperature. The aftercooling can be carried out on a roller board. The take-off rate should be matched accurately to the calendar roll speed in order to prevent defects and thickness variations.

As additional equipment, the extrusion line for the production of sheets can also include a separating saw for cutting the sheet to length, a side trimmer, a stacking unit and a monitoring station. The side or edge trimmer is advantageous since the thickness in the edge region may under certain circumstances not be uniform. At the monitoring station, the thickness and optical properties of the sheet are measured.

The surprising multiplicity of excellent properties makes the novel, transparent, amorphous sheet highly suitable for a multiplicity of different uses, for example for interior room panels, for exhibitions and exhibition articles, as displays, for signs, for protective glazing of machines and vehicles, in the lighting sector, in shop fitting and shelf construction, as advertizing articles, as menu holders and as basketball backboards.

The invention is described in greater detail below with reference to working examples without this representing a limitation.

The individual properties are measured in accordance with the following standards or by the following processes.

Measurement methods

Surface gloss

The surface gloss is measured at a measurement angle of 200 in accordance with DIN 67530.

Light transmission

The light transmission is taken to mean the ratio between the total amount of transmitted light and the amount of incident light.

The light transmission is measured using a "Hazegard plus" instrument in accordance with ASTM 1003.

Haze and clarity

Haze is the percentage of transmitted light deflected from the incident ray bundle by an average of more than 2.5°. The clarity is measured at an angle of less than 2.5°.

The haze and clarity are measured using a "Hazegard plus" instrument in accordance with ASTM 1003.

Surface defects

The surface defects are determined visually.

Charpy impact strength $a_n$

This parameter is determined in accordance with ISO 179/1D.

Izod notched impact strength $a_k$

The Izod notched impact strength $a_k$ is measured in accordance with ISO 180/1A.

Density

The density is determined in accordance with DIN 53479.

SV (DCA) and IV (DCA)

The standard viscosity SV (DCA) is measured in accordance with DIN 53726 in dichloroacetic acid.

The intrinsic viscosity (IV) is calculated as follows from the standard viscosity (SV):

IV (DCA) 3 6.67×10$^{-4}$ SV (DCA)+0.118.

Thermal properties

The thermal properties, such as crystalline melting point $T_m$, crystallization temperature range $T_c$, after- or cold-crystallization temperature $T_{CN}$ and glass transition temperature $T_g$ are measured by differential scanning calorimetry (DSC) at a heating rate of 10° C./min.

Molecular weight and polydispersity

The molecular weights $M_w$ and $M_n$ and the resultant polydispersity $M_w/M_n$ are measured by gel permeation chromatography (GPC).

The examples and comparative examples below each relate to single-layer transparent sheets of various thicknesses produced on the extrusion line described.

EXAMPLE 1

The polyethylene terephthalate from which the transparent sheet is produced has a standard viscosity SV (DCA) of 1010, which corresponds to an intrinsic viscosity IV (DCA) of 0.79 dl/g. The moisture content is <0.2% and the density (DIN 53479) is 1.41 g/cm$^3$. The crystallinity is 59%, and the crystalline melting point, according to DSC measurements, is 258° C. The crystallization temperature range $T_c$ is between 83° C. and 258° C., and the after-crystallization temperature (also known as cold-crystallization temperature) $T_{CN}$ is 144° C. The polydispersity $M_w/M_n$ of the polyethylene terephthalate is 2.14. The glass transition temperature is 83° C.

Before extrusion, the polyethylene terephthalate with a crystallinity of 59% is dried in a drier for 5 hours at 170° C. and then extruded in a single-screw extruder at an extrusion temperature of 286° C. through a sheet die onto a smoothing calendar whose rolls are arranged in an S-shape, and smoothed to give a sheet with a thickness of 2 mm. The first calendar roll has a temperature of 73° C. and the subsequent rolls each have a temperature of 67° C. The take-off rate and the calendar roll speed are 6.5 m/min.

Following aftercooling, the transparent PET sheet with a thickness of 2 mm is trimmed at the edges using separating saws, cut to length and stacked.

The transparent PET sheet produced has the following property profile:

| | |
|---|---|
| - thickness: | 2 mm |
| - surface gloss, 1st side: | 200 |
| (measurement angle 20° ) 2nd side: | 198 |
| - light transmission: | 91% |
| - clarity: | 100% |
| - haze: | 1.5% |
| - surface defects per m$^2$: (fisheyes, orange peel, bubbles, etc) | none |
| - Charpy impact strength $a_n$: | no fracture |
| - Izod notched impact strength $a_k$: | 4.2 kJ/m$^2$ |
| - cold formability: | good, no defects |
| - crystallinity: | 0% |
| - density: | 1.33 g/cm$^3$ |

EXAMPLE 2

A transparent sheet is produced analogously to Example 1 using a polyethylene terephthalate with the following properties:

| | |
|---|---|
| SV (DCA): | 1100 |
| IV (DCA): | 0.85 dl/g |
| Density: | 1.38 g/cm$^3$ |
| Crystallinity: | 44% |
| Crystalline melting point $T_m$: | 245° C. |
| Crystallization temperature range $T_c$: | 82° C. to 245° C. |
| After- or cold-crystallization temperature $T_{CN}$: | 152° C. |
| Polydispersity $M_w/M_n$: | 2.02 |
| Glass transition temperature: | 82° C. |

The extrusion temperature is 280° C. The first calendar roll has a temperature of 66° C. and the subsequent rolls have a temperature of 60° C. The take-off rate and the calendar roll speed are 2.9 m/min.

The transparent PET sheet produced has the following property profile:

| | |
|---|---|
| - thickness: | 6 mm |
| - surface gloss, 1st side: | 172 |
| (measurement angle 20°) 2nd side: | 170 |
| - light transmission: | 88.1% |
| - clarity: | 99.6% |
| - haze: | 2.6% |
| - Surface defects per m$^2$: (fisheyes, orange peel, bubbles, etc) | none |
| - Charpy impact strength $a_n$: | no fracture |
| - Izod notched impact Strength $a_k$: | 4.8 kJ/m$^2$ |
| - cold formability: | good, no defects |
| - crystallinity: | 0% |
| - density: | 1.33 g/cm$^3$ |

EXAMPLE 3

A transparent sheet is produced analogously to Example 2. The extrusion temperature is 275° C. The first calendar a=roll has a temperature of 57° C. and the subsequent rolls have a temperature of 50° C. The take-off rate and the calendar roll speed are 1.7 m/min.

The transparent PET sheet produced has the following property profile:

| - thickness: | 10 mm |
|---|---|
| - surface gloss, 1st side: | 163 |
| (measurement angle 20°) 2nd side: | 161 |
| - light transmission: | 86.5% |
| - clarity: | 99.2% |
| - haze: | 49.5% |
| - surface defects per m²: | none |
| (fisheyes, orange peel, bubbles, etc) | |
| - Charpy impact strength $a_n$: | no fracture |
| - Izod notched impact strength $a_k$: | 5.1 kJ/m² |
| - cold formability: | good, no defects |
| - crystallinity: | 0.1% |
| - density: | 1.33 g/cm³ |

EXAMPLE 4

A transparent sheet is produced analogously to Example 3 using a polyethylene terephthalate with the following properties:

| SV (DCA): | 1200 |
|---|---|
| IV (DCA): | 0.91 dl/g |
| Density: | 1.37 g/cm³ |
| Crystallinity: | 36% |
| Crystalline melting point $T_m$: | 242° C. |
| Crystallization temperature range $T_c$: | 82° C. to 242° C. |
| After- or cold-crystallization temperature $T_{CN}$: | 157° C. |
| Polydispersity $M_w/M_n$: | 2.2 |
| Glass transition temperature: | 82° C. |

The extrusion temperature is 274° C. The first calendar roll has a temperature of 50° C. and the subsequent rolls have a temperature of 45° C. The take-off rate and the calendar roll speed are 1.2 m/min.

The transparent PET sheet produced has the following property profile:

| - thickness: | 15 mm |
|---|---|
| - surface gloss 1st side: | 144 |
| (measurement angle 200) 2nd side: | 138 |
| - light transmission: | 86.4% |
| - clarity: | 97.4% |
| - haze: | 10.5% |
| - surface defects per m²: | none |
| (fisheyes, orange peel, bubbles, etc) | |
| - Charpy impact strength $a_n$: | no fracture |
| - Izod notched impact strength $a_k$: | 5.1 kJ/m² |
| - cold formability: | good, no defects |
| - crystallinity: | 0.1% |
| - density: | 1.33 g/cm³ |

EXAMPLE 5

A transparent sheet is produced analogously to Example 2. 70% of polyethylene terephthalate from Example 2 are blended with 30% of recyclate made from this polyethylene terephthalate.

The transparent PET sheet produced has the following property profile:

| - thickness: | 6 mm |
|---|---|
| - surface gloss, 1st side: | 168 |
| (measurement angle 20°) 2nd side: | 166 |
| - light transmission: | 88.0% |
| - clarity: | 99.4% |
| - haze: | 3.2% |
| - surface defects per m²: | none |
| (fisheyes, orange peel, bubbles, etc) | |
| - Charpy impact strength $a_n$: | no fracture |
| - Izod notched impact strength $a_k$: | 4.7 kJ/m² |
| - cold formability: | good, no defects |
| - crystallinity: | 0% |
| - density: | 1.33 g/cm³ |

Comparative Example 1

A transparent sheet is produced analogously to Example 1. The polyethylene terephthalate employed has a standard viscosity SV (DCA) of 760, which corresponds to an intrinsic viscosity IV (DCA) of 0.62 dl/g. The other properties are identical with the properties of the polyethylene terephthalate from Example 1 within the limits of measurement accuracy. The process parameters and the temperature were chosen as in Example 1. As a consequence of the low viscosity, it was impossible to produce sheets. The melt stability is inadequate, so that the melt collapses on the calendar rolls before cooling.

Comparative Example 2:

A transparent sheet is produced analogously to Example 2, likewise using the polyethylene terephthalate from Example 2. The first calendar roll has a temperature of 83° C. and the subsequent rolls each have a temperature of 77° C.

The sheet produced is extremely hazy. The light transmission, the clarity and the gloss are significantly reduced. The sheet exhibits surface defects and structures. The optical properties are unacceptable for a transparent application.

The sheet produced has the following property profile:

| - thickness: | 6 mm |
|---|---|
| - surface gloss, 1st side: | 95 |
| (measurement angle 20°) 2nd side: | 93 |
| - light transmission: | 74% |
| - clarity: | 90% |
| - haze: | 52% |
| - surface defects per m²: | bubbles, orange peel |
| (fisheyes, orange peel, bubbles, etc) | |
| - Charpy impact strength $a_n$: | no fracture |
| - Izod notched impact strength $a_k$: | 5.0 kJ/m² |
| - cold formability: | good |
| - crystallinity: | approx. 8% |
| - density: | 1.34 g/cm³ |

What is claimed is:

1. A transparent, amorphous sheet having a thickness in the range from 1–20 mm which contains, as principal constituent, a crystallizable thermoplastic selected from the group consisting of polyethylene terephthalate, polybutylene terephthalate a cycloolefin polymer and a cycloolefin copolymer, where the surface gloss, measured in accordance with DIN 67530 (measurement angle 20°), is greater than 130, the light transmission, measured in accordance with ASTM D 1003, is greater than 84%, and the haze of the sheet, measured in accordance with ASTM D 1003, is less than 15% and where the sheet has a degree of crystallinity of less than 5%.

2. A sheet au claimed in claim 1, where the crystallizable thermoplastic used is polyethylene terephthalate.

3. A sheet as claimed in claim 2, whore the polyethylene terephthalate contains recycled polyethylene terephthalate.

4. A sheet an claimed in claim 2, where the measurement of the Charpy impact strength a, measured in accordance with ISO 179/1D, is not accompanied by a fracture.

5. A sheet as claimed in claim 2, where the Izod notched impact strength $a_k$, measured in accordance with ISO 180/1A, is in the range from 2.0 to 8.0 kJ/m$^2$.

6. A sheet as claimed in claim 2, where the clarity, measured in accordance with ASTM D 1003 at an angle of less than 2.5°, is greater than 96%.

7. A sheet as claimed in claim 2, where the polyethylene terephthalate has a crystalline melting point, measured by DSC at a heating rate of 10° C./min, in the range from 220° to 280° C.

8. A sheet as claimed in claim 2, where the polyethylene terephthalate has a crystallization temperature, measured by DSC at a heating rate of 10° C./min, in the range from 75° to 280° C.

9. A sheet as claimed in of claim 2, where the polyethylene terephthalate employed has a crystallinity in the range from 5 to 65%.

10. A sheet as claimed claim 2, wherein the polyethylene terephthalate employed has a standard viscosity SV (DCA), measured in dichloroacetic acid in accordance with DIN 53728, in the range from 800 to 1800.

11. A sheet as claimed in claim 10, where the polyethylene terephthalate employed has a standard viscosity SV (DCA), measured in dichloroacetic acid in accordance with DIN 53728, in the range from 800 to 1400.

12. A process for the production of a transparent, amorphous sheet as claimed in claim 1 to which comprises the following steps: melting of the crystallizable thermoplastic in the extruder, extrusion of the melt through a die, calibration, smoothing and cooling of the extrudate with at least two rolls in a polishing stack, and cutting of the sheet to size, where the first roll of the polishing stack has a temperature in the range from 50 to 80° C.

13. The process as claimed in claim 12, where the crystallizable thermoplastic is dried before melting.

14. The process as claimed in claim 12, where the crystallizable thermoplastic is polyethylene terephthalate.

15. The process as claimed in claim 14, where the polyethylene terephthalate is dried at from 160 to 180° C. for from 4 to 6 hours before extrusion.

16. The process as claimed in claim 14, where the temperature of the PET melt is in the range from 250 to 320° C.

* * * * *